United States Patent Office 3,449,563
Patented June 10, 1969

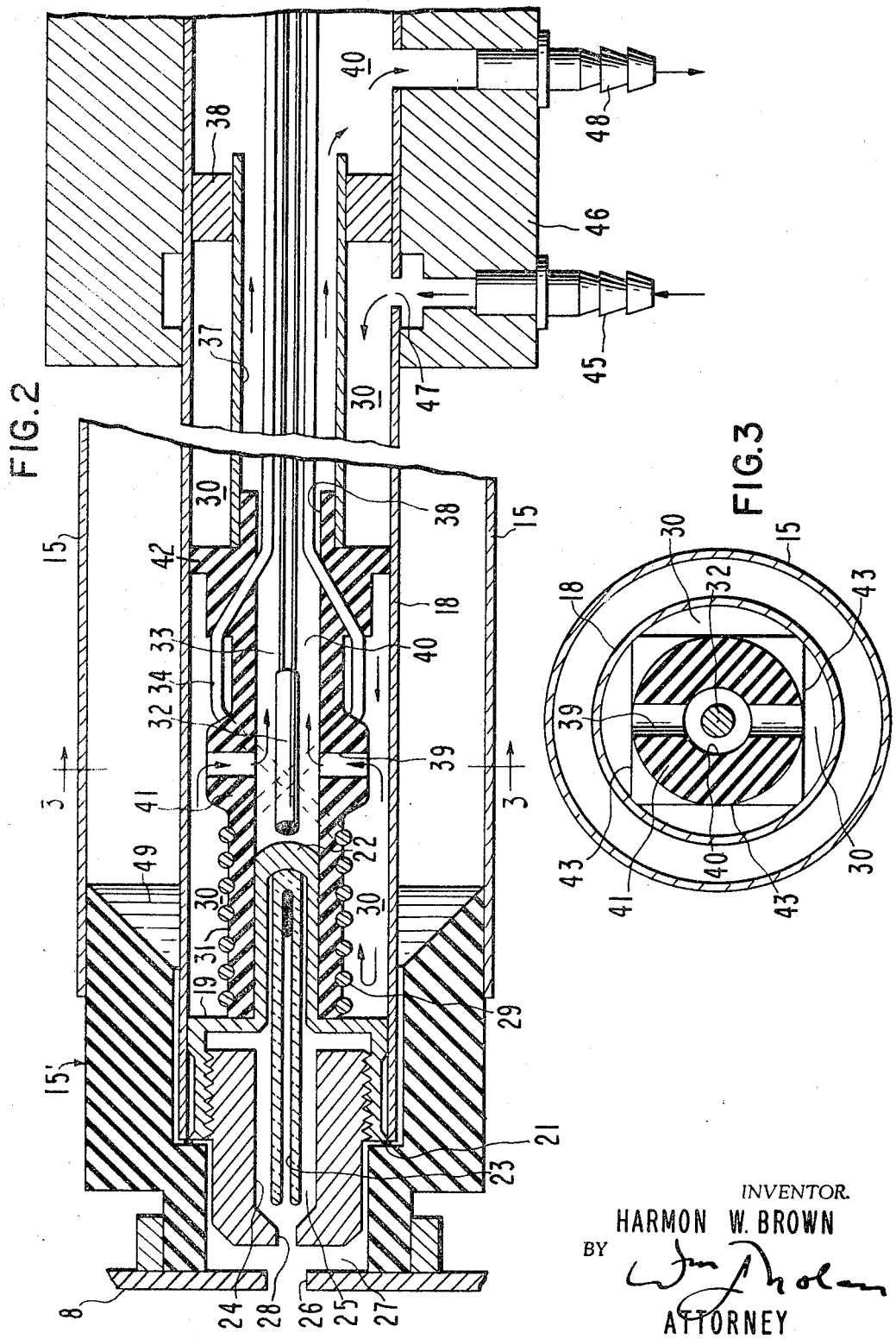

3,449,563
SAMPLE INSERTION PROBE HAVING INTEGRAL SAMPLE INTRODUCTION CONTROL MEANS AND MASS SPECTROMETER MEANS USING SAME
Harmon W. Brown, Sunnyvale, Calif., assignor to Varian Associates, Palo Alto, Calif., a corporation of California
Filed Feb. 21, 1966, Ser. No. 528,946
Int. Cl. B01d *59/44*
U.S. Cl. 250—41.9                    9 Claims

ABSTRACT OF THE DISCLOSURE

A cycloidal mass spectrometer is disclosed. The spectrometer includes an improved sample insertion probe for inserting materials to be analysed through the vacuum envelope of the mass spectrometer into the region of the ion source. The sample probe includes a sample cavity containing the sample of material to be volatilized. A gas passageway communicates between the cavity in the probe and the cavity of the ion source for passing volatilized sample material into the ion source. The probe also includes integral means for controlling the rate at which the volatilized sample material enters the ion source from the sample cavity, whereby a precise control over the rate of sample introduction is obtained. The rate at which the volatilized sample enters the source is controlled by selection of a proper nozzle disposed at the exit to the sample cavity for controlling the flow of the volatilized sample into the ion source. In addition, means such as a heater or cooler are provided integrally of the probe for controlling the temperature of the sample to be volatilized, thereby controlling the rate at which the sample is volatilized for passing into the ion source. In a preferred embodiment, a temperature sensing element is disposed within the probe such that the temperature of the sample cavity may be precisely controlled. By providing a more precise control over the rate of sample volatilization and sample introduction into the ion source, a wider range of sample material may be analysed in a shorter time with less system contamination.

---

Figure 1:
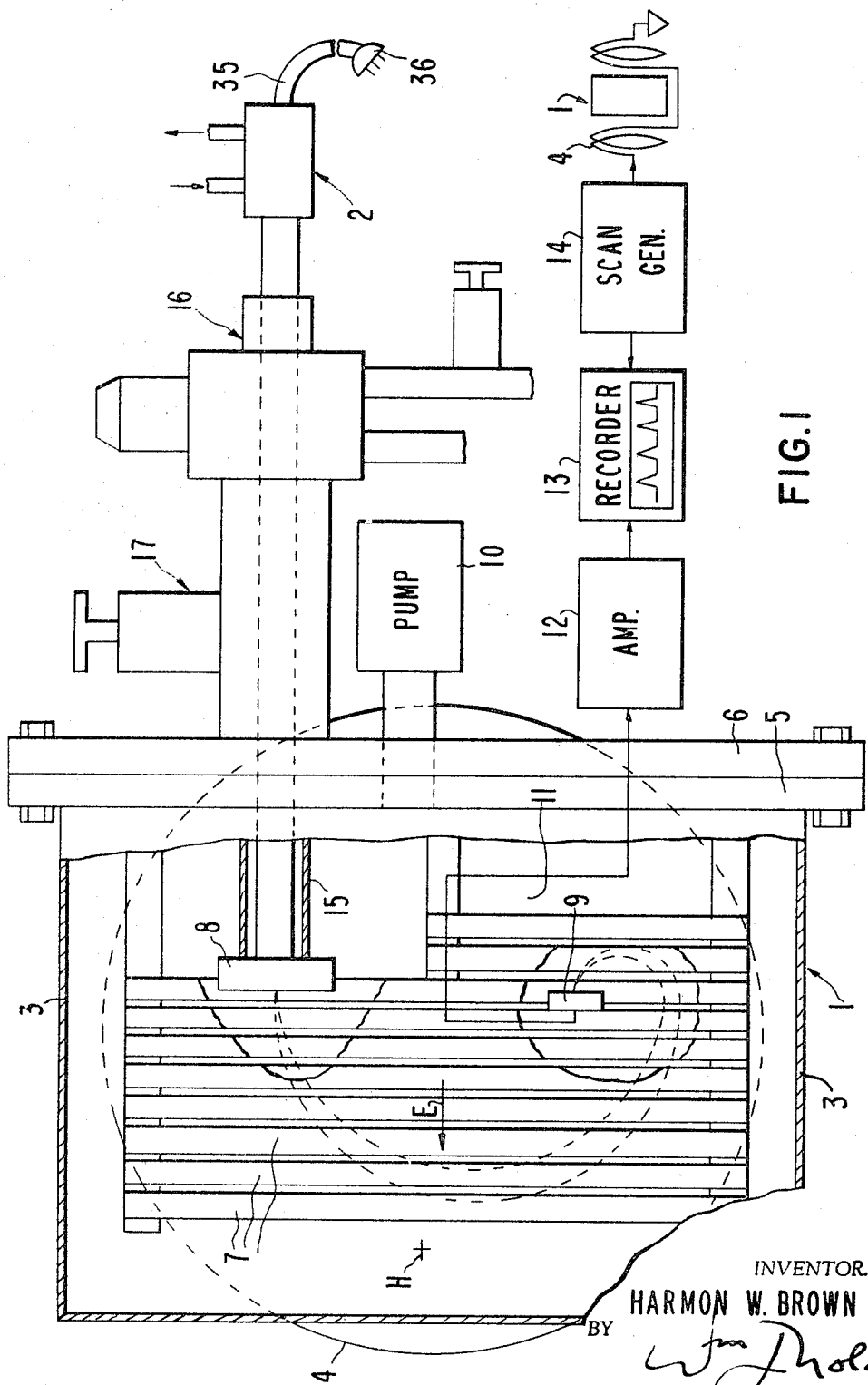

Heretofore sample insertion probes have been built for direct insertion of sample materials, through suitable vacuum locks, into the ion source region of mass spectrometers. However, in these prior probes any control over the rate of introduction of sample material, such as that control exercised by temeprature of the sample substance, was provided external of the art. For example, in the prior probe the probe was inserted through a vacuum lock into a metallic block containing the ionizing electron gun and beam collector of the ion source and located inside the vacuum envelope. This metallic block, into which the probe was inserted, also included heater means for elevating its temperature from a normal operating temperature of approximately 80° C. to an upper temperature of 250° C. Rapid and precise control over the temperature of the sample was not attainable because the sample material within the probe was heated only indirectly from the heated block by conduction and substantial time was required for the probe to reach thermal equilibrium with the block. Furthermore, reducing the temperature of the block to accommodate a different sample material was very time consuming due to the thermal lag caused by the thermal isolation of the block inside the vacuum enevlope.

In the present invention the sample introduction probe is provided with control means integral therewith for controlling the rate of sample introduction into the ion source region of the mass spectrometer, whereby more precise and rapid control over sample introduction is obtained. In a preferred embodiment of, the present invention, integral means are provided for heating or cooling the sample region of the probe, whereby samples may be introduced over wide temperature ranges extending even below the ambient temperature of the ion source region of the spectrometer. Furthermore an additional integral control of the rate of sample introduction is provided by a series of interchangeable sample exit nozzles whereby the sample vapors entering the ion source region of the spectrometer may be throttled as desired to obtain more precise control of sample introduction.

The principal object of the present invention is the provision of improved direct sample introduction probes for mass spectrometers whereby improved performance of mass spectrometers using same is obtained.

One feature of the present invention is the provision of a sample introduction probe for a mass spectrometer wherein the probe includes control means integral therewith for controlling the rate of sample introduction.

Another feature of the present invention is the same as the preceding feature wherein the integral control means includes a heating and/or cooling element internal of the probe.

Another feature of the present invention is the same as any one or more of the preceding features wherein the control means includes a nozzle on the probe for controlling the flow of sample material from the probe into the ion source of the mass spectrometer.

Other features and advantages of the present invention will become apparent upon a perusal of the following specification taken in connection with the accompanying drawings wherein:

FIG. 1 is a side elevation view partly in section and partly schematic of a cycloidal mass spectrometer employing features of the present invention, FIG. 2 is an enlarged longitudinal section of a sample insertion probe structure incorporating features of the present invention, and FIG. 3 is a transverse sectional view of the structure of FIG. 2 taken along line 3—3 in the direction of the arrows.

Referring now to FIG. 1 there is shown a cycloidal type mass spectrometer 1 incorporating the direct sample insertion probe 2 of the present invention. Such a spectrometer is described in U.S. Patent No. 2,221,467 issued Nov. 12, 1940. The mass spectrometer 1 comprises a hollow rectangular vacuum envelope 3 as of stainless steel positioned in the gap of a powerful electromagnet 4 for producing a magnetic field H passing through the enevlope 3. The envelope 3 is flanged at one end by rectangular flange 5 which mates, in a vacuum tight manner, with a similar rectangular flange member 6. The envelope is evacuated to a pressure as of $10^{-3}$ torr via pump 10.

Flange 6 supports therefrom a series of stacked and insulated rectangular rings 7 for producing a uniform electric field E at right angles to the magnetic field H. An ion source 8 is located in a region of uniform electric and magnetic fields and serves to ionize gaseous substances introduced into the source 8 and to project these ions through a slit into the crossed field region.

Under the influence of the crossed fields the ions will execute a cycloidal trajectory coming to a focus through a slit onto a detector 9. The number of atomic mass units of the ions focused onto the detector is proportional to the second power of the magnetic field intensity 4 and inversely proportional to the electric field intensity E. For any given combination of H and E only ions having a certain number of mass units will be detected. A mass spectrum is obtained by scanning the magnetic field H and leaving the electric field fixed.

The mass spectrum output signal is detected by detector 9 and fed via lead 11 to an amplifier 12 and thence to the X axis of an X-Y recorder 13. The magnetic field H is scanned by a signal derived from a scan generator 14 which controls the current to the electromagnet 4. A sample of the scan signal is fed to the Y axis of the recorder 13 to produce the recorded mass output spectrum of the substances under analysis in the spectrometer 1.

Vaporized substances to be analyzed are introduced into the ion source 8 through an inlet pipe 15 as of stainless steel which is provided with heating elements, not shown, externally thereof to prevent condensation of vapors therein. The gas inlet pipe 15 extends out to the flange 6 and is coupled to a conventional leak valve, not shown, for leaking gas into the source 8.

The direct sample introduction probe 2 of the present invention enters the source region by being inserted within the normal gas inlet pipe 15. The probe 2 is inserted via conventional means of a two stage vacuum lock assembly 17, and thence through the flange 6 and into the normal gas inlet pipe 15 (see FIGS. 2 and 3).

The body of the probe 2 includes an outer tube 18 as of 0.5" diameter stainless steel 30" in length. The inner end of the tube 18 is closed off by a funnel shaped member 19 as of stainless steel which is welded at its lip 21 to form a vacuum tight joint with the end lip portion of tube 18. The hollow stem portion 22 of the funnel shaped member 19 receives a glass capillary tube 23 containing the sample substance to be analyzed by the mass spectrometer 1. The mouth of the funnel member is closed off by a nozzle 24, as of copper with a rhodium flash plating, which is threaded into the internal threaded mouth of the funnel member 19. The nozzle 24 and funnel member, which member 19 is closed off at the inner end of its stem 22, define a sample cavity 25.

Sample material, contained within the sample cavity 25, is volatilized and passed into the source 8 through an opening 26 therein communicating with a gas passageway defined by a short length 27 of the inlet pipe 15 and the restricting orifice 28 of the nozzle 24.

The rate of introduction of sample material into the source 8 is controlled by the temperature of the sample cavity 25 and the amount of the orifice restriction 28 offered by the nozzle 24. Nozzles 24 are replaceable such that different nozzles 24 can be made with different dimensions representing a series of varying degrees of restriction at the orifice 28. A typical nozzle of the present invention has an orifice opening at 28 with an area of about 40 circular mils. Another sized nozzle has an area at its orifice opening of about 20 circular mils.

The temperature of the sample cavity is controlled by heating and cooling means integral of the probe body. A base heating element 29 as of tungsten is carried upon a grooved cylindrical insulating form 31 as of boron nitride. Boron nitride also forms a good thermal conductor for conducting heat from the heating element 29 to the glass sample capillary tube 23 disposed coaxially within the heating element 29 and coil form 31.

A heat sensing element 32, such as a thermistor, is disposed within the hollow coil form 31 adjacent the closed end of the sample cavity 25 for sensing the temperature of the sample cavity 25. The thermistor leads 33 and the heater element leads 34 pass out of the coil form 31 coaxially thereof and extend through the length of the probe 2 along the axis thereof to a suitable hermetically sealed electrical cable 35 and connector 36 affixed to the probe 2 at its outer end (see FIG. 1).

A cylindrical septum tube 37 as of stainless steel is coaxially disposed of the probe 2 surrounding the electrical leads 33 and 34. The septum tube 37 is joined at its inner end to an internal sleeve portion 38 of the coil form 31. The septum tube 37 and hollow coil form 31 serve to divide the body of the probe 2 into two passageways. A first annular passageway 30 surrounds the septum tube 37 and coil form 31 and extends the length of the probe 2 to the sample cavity 25. The other passageway is a cylindrical inside passageway 40 inside of the coil form 31 and septum tube 37 and likewise extends the length of the body of the probe 2 to the sample cavity 25.

The outside annular passageway is closed off at its outer end by a ring member 38. The two passageways are interconnected near the sample cavity 25 by a pair of radially directed bores 39 passing through a collar portion 41 of the coil form 31. The coil form 31 includes an end collar 42 provided with flats 43 to provide center support for the coil form 31 and septum tube 37 while providing gas passageways past the flats 43 to prevent blockage of the outer annular passageway 30.

A coolant fluid is passed through the passageways 30 and 40 of the body of the probe 2 for cooling the sample cavity 25, as desired. A suitable coolant fluid would include cool air or liquid nitrogen vapor if required to reach low temperatures for the sample cavity 25. The coolant fluid is introduced into the outer passageway 30 via pipe fitting 45 communicating through a probe handle 46 as of aluminum and into the outer passageway 30 via opening 47 in the outer tube 18. The coolant passes along the length of the probe 2 to the region of the sample cavity 25 and heater 29 for removing heat as desired. The expended coolant fluid is extracted from the sample cavity 48 region via radial bores 39 and the inner passageway 40 which communicate with an exhaust pipe fitting 48 passing through the tube 18 and handle 46.

In use the sample capillary 23 is loaded in the open end of the funnel member 19 and the sample cavity closed off by threading in the proper sized nozzle 24 for the particular sample. The probe 2 is then inserted through the vacuum lock 16 and valve 17 into the gas inlet tube 15. The inner end of the inlet tube 15' includes a hollow electrical insulator member 49 to permit the source 8 to operate at an independent electrical potential. The probe 2 is pushed up against the insulator at the weld 21. The sample cavity 25 of the probe is brought to its desired operating temperature as measured by the sensing element 32 and its conventional associated circuitry, not shown. The operating temperature is achieved by adding or subtracting heat from the probe 2 via electrical heating element 29 or by applying coolant via passageways 30 and 40.

Precise temperature and/or nozzle control over the introduction of the sample material into the ion source 8, as obtained by the integral control means of the probe 2, prevents excessive contamination of the spectrometer by the sample material thereby minimizing clean up time to eliminate undesired mass spectral line background. Also the integral probe cooling means facilitates rapid replacement of samples since the probe is preferably cooled before removal. Furthermore the precise temperature control obtained permits volatilizing certain difficult materials without producing excessive heating and thus unwanted decomposition of the sample.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Probe apparatus for insertion of sample materials through a vacuum envelope into the ion source of a mass spectrometer including, means forming an elongated probe body to be inserted and withdrawn through, and hermetically sealed to, an aperture in the vacuum envelope of the mass spectrometer, said probe body having a cavity therein for holding a sample of matter to be volatilized within said probe cavity, means forming a gas passageway in said probe body communicating between said sample cavity and the ion source when the probe apparatus is inserted through the vacuum envelope for passing volatilized sample material from said cavity into the ion source, and means integral of said probe body means and including a restrictive nozzle in said gas passageway between said sample cavity and the ion source for controlling the rate at which volatilized sample material enters the source from said sample cavity, whereby a precise control over sample introduction is obtained.

2. The apparatus according to claim 1 wherein said control means includes means integral of the probe for controlling the temperature of the sample cavity.

3. The apparatus according to claim 2 wherein said control means includes a heating element integral of the probe for heating said sample cavity.

4. The apparatus according to claim 2 wherein said control means includes a coolant passage integral of the probe for flowing a coolant through said probe body to cool said sample cavity.

5. The apparatus according to claim 2 wherein said temperature control means includes a temperature sensing element integral with the probe for sensing the temperature of the probe.

6. The apparatus according to claim 1 wherein said nozzle is removable and replaceable.

7. The apparatus according to claim 1 wherein said nozzle provides a restriction in said gas passageway means which has an area of less than 60 circular mils.

8. The apparatus according to claim 7 wherein said nozzle provides a restriction in said gas passageway means which has an area of less than 30 circular mils.

9. The apparatus according to claim 1 in combination with a mass spectrometer for mass analyzing the sample introduced into the ion source of said spectrometer via the probe apparatus.

References Cited

UNITED STATES PATENTS

| 2,702,479 | 2/1955 | Black et al. | |
| 2,714,164 | 7/1955 | Riggle et al. | |
| 2,943,195 | 6/1960 | Starr. | |
| 3,158,740 | 11/1964 | Craig et al. | 313—231 |

RALPH G. NILSON, *Primary Examiner.*

S. C. SHEAR, *Assistant Examiner.*